(12) United States Patent
Okada et al.

(10) Patent No.: US 8,364,445 B2
(45) Date of Patent: Jan. 29, 2013

(54) GENERATION DEVICE OF THREE-DIMENSIONAL ARRANGEMENT ADJUSTMENT CAD DATA FOR CABLE HOUSING COMPONENTS, AND CONTROL METHOD AND CONTROL PROGRAM FOR SAME

(75) Inventors: Yuuki Okada, Kawasaki (JP); Hiroki Yabu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 363 days.

(21) Appl. No.: 12/721,195

(22) Filed: Mar. 10, 2010

(65) Prior Publication Data

US 2010/0235147 A1    Sep. 16, 2010

(30) Foreign Application Priority Data

Mar. 12, 2009 (JP) .................................. 2009-58862

(51) Int. Cl.
*G06F 17/50* (2006.01)
(52) U.S. Cl. .......................................................... 703/1
(58) Field of Classification Search ................... 703/6, 1
See application file for complete search history.

(56) References Cited

U.S. PATENT DOCUMENTS

2007/0038415 A1    2/2007    Okada et al.

FOREIGN PATENT DOCUMENTS

| JP | 6-309418 A | 11/1994 |
|---|---|---|
| JP | 09-167173 A | 6/1997 |
| JP | 2001-177934 A | 6/2001 |
| JP | 2003-157289 A | 5/2003 |
| JP | 2004-013838 A | 1/2004 |
| JP | 2006-195544 A | 7/2006 |
| JP | 2007-052495 A | 3/2007 |
| JP | 2007-257136 A | 4/2007 |

OTHER PUBLICATIONS

Fumiyoshi Mochizuki, et al., "Current Situation of Engineering Office Automation in Plant Construction", Mitsubishi Electric Technical Report, Apr. 25, 1996, vol. 70, No. 4, pp. 82 to 87.

*Primary Examiner* — Hugh Jones
(74) *Attorney, Agent, or Firm* — Foley & Lardner LLP

(57) ABSTRACT

A device even at the time of initial planning of plant design easily and rapidly generates three-dimensional arrangement adjustment CAD data which describes a route for arrangement of cable housing components. An area generation section 410 generates a prescribed rectangular parallelepiped area from the minimum and maximum coordinates. A cable information acquisition section 420 acquires information relating to cables such as cable specifications, starting point information, and end point information. A route generation section 430 generates a cable housing component route between a starting point area and an end point area through via areas. A route consolidation section 440 consolidate into a single route any route having the same cable specification, starting point information, via information, and end point information. A three-dimensional model conversion section 480 adds a prescribed width and height to the consolidated route to generate a three-dimensional cable housing component route model.

14 Claims, 19 Drawing Sheets

FIG. 3
| Unique name | Direction | Coordinate | Area name |
|---|---|---|---|
| X1 | X | 1000 | Area 1 |
| X2 | X | 2000 | Area 1 |
| Y1 | Y | 1000 | Area 1 |
| Y2 | Y | 1500 | Area 1 |
| Z1 | Z | 0 | Area 1 |
| Z2 | Z | 500 | Area 1 |
FIG. 4
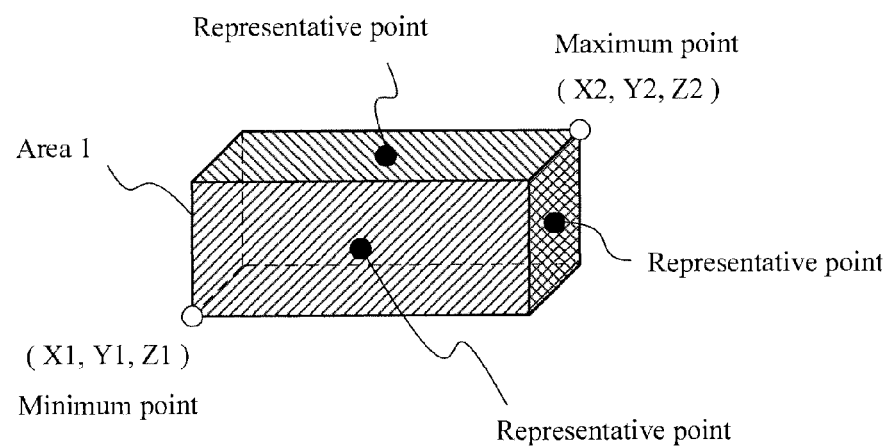
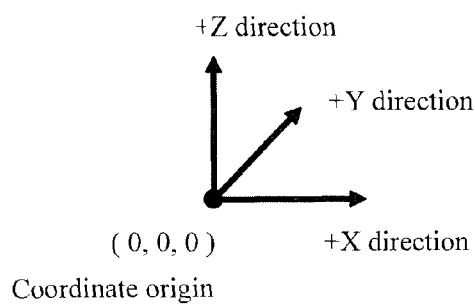
(0, 0, 0)
Coordinate origin

FIG. 13

| Cable Specification | Starting Point Information | Via Information | End Point Information | Cable Length |
|---|---|---|---|---|
| Cable number<br>Conforming cable housing component<br>Voltage<br>Type<br>Number of cores<br>Size<br>System<br>( Cross-sectional area ) | Area number<br>Building number<br>Equipment (panel) number<br>Interface direction<br>(upward or downward) | Via area 1<br>Via area 2<br>Via area 3<br>Via area 4<br>Via area 5<br>...... | Area number<br>Building number<br>Equipment (panel) number<br>Interface direction<br>(upward or downward) | ...... |

FIG. 15

| Input File | Output File |
|---|---|
| Cable list file<br>Cable specification file<br>Area coordinate file | Cable list file (reflecting processing results)<br>Three-dimensional cable housing component model file<br>Processing process log file |

| Processing Filter | Cross-section Setting | Route Setting | Other Setting |
|---|---|---|---|
| Conforming cable housing component<br>Voltage<br>Type<br>...... | Cable occupancy<br>Width (fixed)<br>Height (fixed)<br>Interval between cable housing components<br>Display method of cross-section<br>(Locus line display, Hollow display, ...<br>...... | Horizontal bending radius<br>Vertical bending radius<br>Arm length from area face<br>Interface length to equipment<br>...... | |

FIG. 16

| | | | | | | |
|---|---|---|---|---|---|---|
| Cable Specification | system | A-Sys | A-Sys | A-Sys | A-Sys | A-Sys |
| | cable No. | CABLE-001 | CABLE-002 | CABLE-003 | CABLE-004 | CABLE-005 |
| | conforming tray | | | | | |
| | voltage | Low Voltage | Low Voltage | Low Voltage | Low Voltage | Low Voltage |
| | type | 0.6/1.0 (1.2) kV | 0.6/1.0 (1.2) kV | 0.6/1.0 (1.2) kV | 0.6/1.0 (1.2) kV | 0.6/1.0 (1.2) kV |
| | number of core | XLPE/PVC | XLPE/PVC | XLPE/PVC | XLPE/PVC | XLPE/PVC |
| | size | 1C | 1C | 1C | 1C | 1C |
| | unit | 120 | 120 | 120 | 120 | 120 |
| | cross-section | sq | sq | sq | sq | sq |
| Starting Point Information | equipment | starting equip. | starting equip. | starting equip. | starting equip. | starting equip. |
| | building | starting point building | starting point building | starting point building | starting point building | starting point building |
| | area | starting point area | starting point area | starting point area | starting point area | starting point area |
| | interface | downward | downward | downward | downward | downward |
| Via Information | via area 1 | via area 1 | via area 1 | via area 1 | via area 1 | via area 1 |
| | via area 2 | via area 2 | via area 2 | via area 2 | via area 2 | via area 2 |
| | ... | ... | ... | ... | ... | ... |
| End Point Information | equipment | end equip. 1 | end equip. 2 | end point equip. 3 | end point equip. 4 | end point equip. 5 |
| | building | end point building | end point building | end point building | end point building | end point building |
| | area | end point area | end point area | end point area | end point area | end point area |
| | interface | downward | downward | downward | downward | downward |
| Reflection | length | | | | | |

GENERATION DEVICE OF THREE-DIMENSIONAL ARRANGEMENT ADJUSTMENT CAD DATA FOR CABLE HOUSING COMPONENTS, AND CONTROL METHOD AND CONTROL PROGRAM FOR SAME

BACKGROUND OF THE INVENTION

1. Field of the Invention

This invention relates to a device for easily generating three-dimensional arrangement adjustment CAD data, which describes arrangement routes, within a plant, for cable housing components, such as cable trays, cable racks, duct banks, and cable conduits, and similar, by utilizing a cable list in which cable specifications, via information, and similar are described, as well as a control method and control program for such a device.

2. Description of the Related Art

Normally, plans for arrangement of cable trays, cable racks, duct banks, cable conduits, and other cable housing components installed in thermal power plants, nuclear power plants, and hydroelectric plants are generated at the time of design of the plant itself. In particular, plans for arrangement of the cable housing components are generally generated by three-dimensional arrangement adjustment CAD, due to the convenience of the data input and the subsequent downstream development and management.

In this three-dimensional arrangement adjustment CAD, as arrangement plans, a cable list in which are stored cable specifications which are the cable voltages, types, number of cores, and similar, a plot plan which is a basic design diagram equivalent to an overall plan of the plant, and an equipment arrangement diagram which describes in detail the locations of equipment, electrical panels, control panels, and similar in the building which houses the electric power generation turbine facilities, are used, and three-dimensional routes of cable housing components within the plant are generated.

Specifically, based on plot plans and equipment arrangement diagrams, the designer of cable housing components uses three-dimensional arrangement adjustment CAD to arrange three-dimensional CAD parts for straight lines, curved portions, and branch portions of cable housing components in a virtual three-dimensional space, based on experience and instinct. And, by connecting the parts arranged in this way, a three-dimensional route of cable housing components is generated.

In the prior art, inventions have been proposed which, based on arrangement plans generated in detail for cable housing components which is two-dimensional CAD data, perform conversion into three-dimensional CAD data (see Japanese Patent Application Laid-open No. 2004-13838, Japanese Patent Application Laid-open No. 2003-157289 and Japanese Patent Application Laid-open No. H6-309418). And, based on a cable housing component arrangement route given in advance, an invention which, based on a arrangement route for cable housing components given in advance, inputs the cable housing components from three-dimensional CAD is given (see Japanese Patent Application Laid-open No. 2001-177934). And inventions have been proposed in which, in circumstances in which the route of the cable housing components and cross-sectional size are decided in advance, the cable route is selected (see Japanese Patent Application Laid-open No. 2007-52495 and Japanese Patent Application Laid-open No. 2006-195544). Further, an invention has been proposed in which, when single-wire connection diagrams, route layout diagrams, and equipment arrangement diagrams are generated independently in detail, appropriate routes for cables are calculated (see Japanese Patent Application Laid-open No. 2007-257136).

However, as explained above, because planning of arrangement of cable housing components is performed using three-dimensional arrangement adjustment CAD based on the experience and instinct of the designer, a large amount of time is required for design, and in particular, generation has not been possible at the time of initial planning of the plant design. For this reason, delays in planning the arrangement of cable housing components at the time of initial planning of the plant design have given rise to other dependent delays, and consequently have caused delays in various dependent downstream processes.

Further, at the time of initial planning of plant design, because the route for cable housing components has not been finalized, the amount of material resources of cable housed therein cannot be totaled, and at the same time, the amount of material resources of the cable housing components and the hanger supports for these components cannot be totaled, so that prominent differences have occurred between the physical quantities prepared and the physical quantities actually required.

In the inventions of all the above Japanese Patent Application Laid-open No. 2004-13838, Japanese Patent Application Laid-open No. 2003-157289 and Japanese Patent Application Laid-open No. H6-309418, three-dimensional CAD data is generated based on cable housing component arrangement plans, which are two-dimensional CAD data generated in detail; in addition, because conditions imparted to the two-dimensional CAD data are required, this three-dimensional data is not generated at the stage of initial planning of the plant design. Further, the inventions of the above Japanese Patent Application Laid-open No. 2001-177934, Japanese Patent Application Laid-open No. 2007-52495 and Japanese Patent Application Laid-open No. 2006-195544 are proposals for circumstances in which the arrangement routs of cable housing components are decided in advance, and the invention of the above Japanese Patent Application Laid-open No. 2007-257136 imposes as a condition a case in which single-line wiring diagrams, electrical layout diagrams, and equipment arrangement diagrams have been independently generated in detail, and so does not assume generation of an initial planning stage at the time of plant design.

SUMMARY OF THE INVENTION

This invention is proposed in order to resolve the above problems, and has as an object the provision of a three-dimensional arrangement adjustment CAD data generation device for cable housing components, which even at the time of initial planning of plant design easily and rapidly generates three-dimensional arrangement adjustment CAD data which describes a route for arrangement of cable housing components, as well as a control method and control program for such a device.

In order to attain the above-described object, this invention relates to a generation device of three-dimensional arrangement adjustment CAD data for cable housing components, which designs using a three-dimensional CAD to arrange cable housing components for housing cables provided within a plant, the generation device comprising: an area coordinate file in which the minimum and maximum coordinates configuring a prescribed rectangular parallelepiped area are stored; a cable list file in which cable data including specifications of the cables, starting point data, via data, and end point data is stored; an area generation section which reads the minimum and maximum coordinates from the area coordinate file and generates the prescribed rectangular parallelepiped area; a cable data acquisition section which acquires the cable data from the cable list file; a route generation section which generates, for each cable, a cable housing component route for arrangement of cable housing components which connects the area corresponding to the starting point data with the area corresponding to the end point data via areas corresponding to the via data, based on the prescribed rectangular parallelepiped area generated by the area generation section and the cable data acquired by the cable data acquisition section; a route consolidation section which consolidates into a single route any route having in common the cable specifications, the starting point data, the via data, and the end point data from among the cable housing component routes generated by the route generation section; and a three-dimensional model conversion section which converts into a three-dimensional model by imparting a prescribed cross-section to the cable housing component route consolidated by the route consolidation section.

By means of the invention described above, a cable housing component three-dimensional arrangement adjustment CAD data generation device, and a control method and control program for such a device, can be provided which can utilize cable specifications and other cable data from the cable list file, and moreover can consolidate cable housing component routes having the same cable specifications, starting point data and similar into one as the same route, so that even at the beginning of plant design, three-dimensional arrangement adjustment CAD data, which describes cable housing component routes, can be generated easily and rapidly. By generating cable housing component routes in the initial stage of plant design, appropriate totaling of amount of material resources, procurement, and manufacture of cable housing components are possible, and moreover totaling of amount of material resources and procurement of the cable housed within the cable housing components are also possible.

BRIEF DESCRIPTION OF THE DRAWINGS

FIG. 3 shows the configuration of an area coordinate file of an embodiment of the invention;

FIG. 4 shows a prescribed rectangular parallelepiped area of an embodiment of the invention;

FIG. 13 shows the configuration of a cable list file after processing by the control unit of an embodiment of the invention;

FIG. 15 shows an input screen at the time of initial settings of an embodiment of the invention;

FIG. 16 shows an example of a cable list file of an embodiment of the invention;

DESCRIPTION OF THE PREFERRED EMBODIMENTS

{Embodiment}
{1. Configuration}

Figure 1:
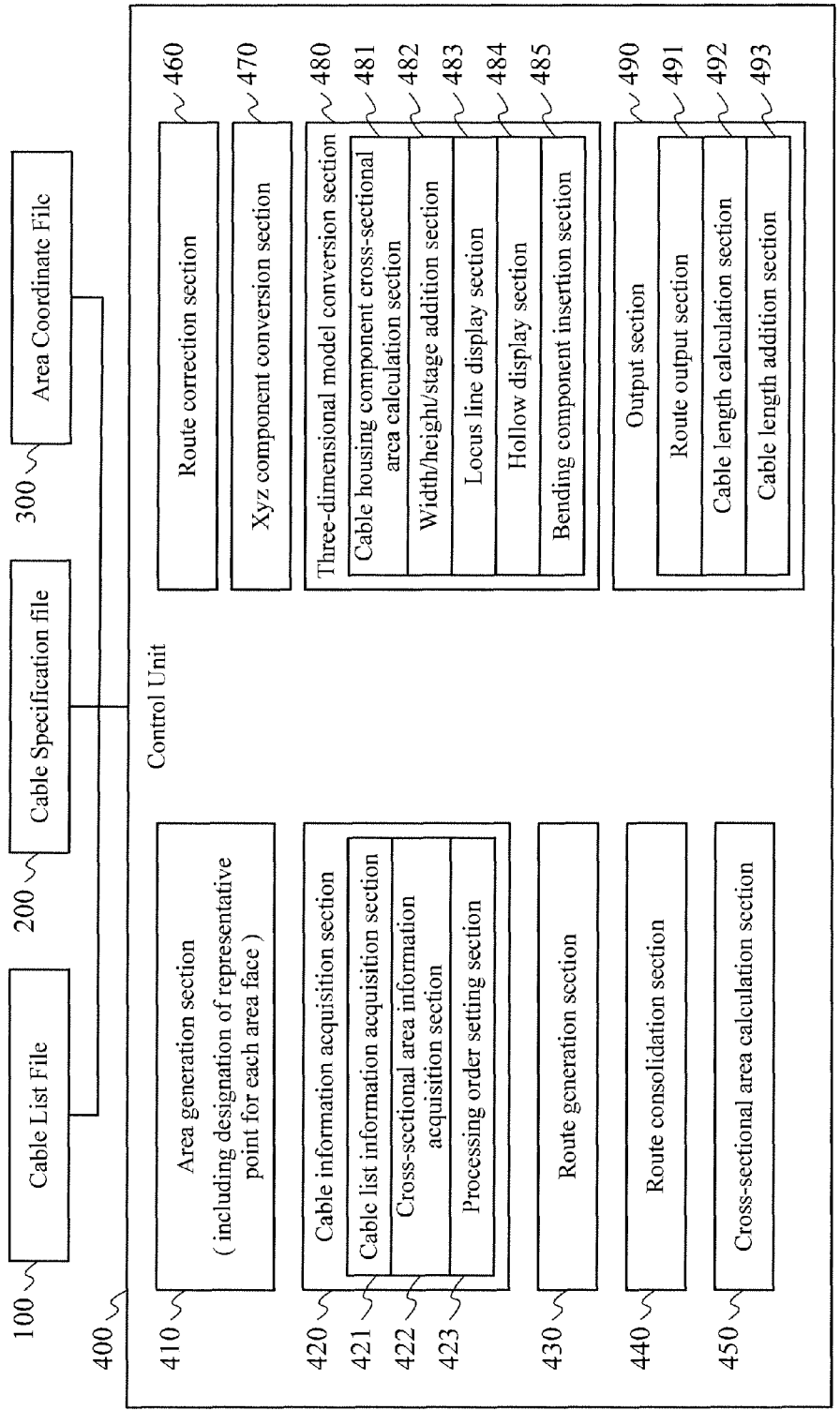
FIG. 1 is a functional block diagram showing an example of the overall configuration of an embodiment of the invention.

Next, the configuration of a three-dimensional arrangement adjustment CAD data generation device for cable housing components of this embodiment is explained below, referring to FIG. 1 to FIG. 13. FIG. 1 is a functional block diagram showing the configuration of this system of the invention.

As shown in FIG. 1, this invention comprises a cable list file 100 in which are stored cable specifications and similar, a cable specification file 200 in which are stored cable cross-sectional areas according to the cable specifications, an area coordinate file 300 in which are stored coordinates comprised by a prescribed rectangular parallelepiped area, and a control unit 400 which executes various functions.

{1.1. Cable List File, Cable Specification File, Area Coordinate File}

Figure 2:
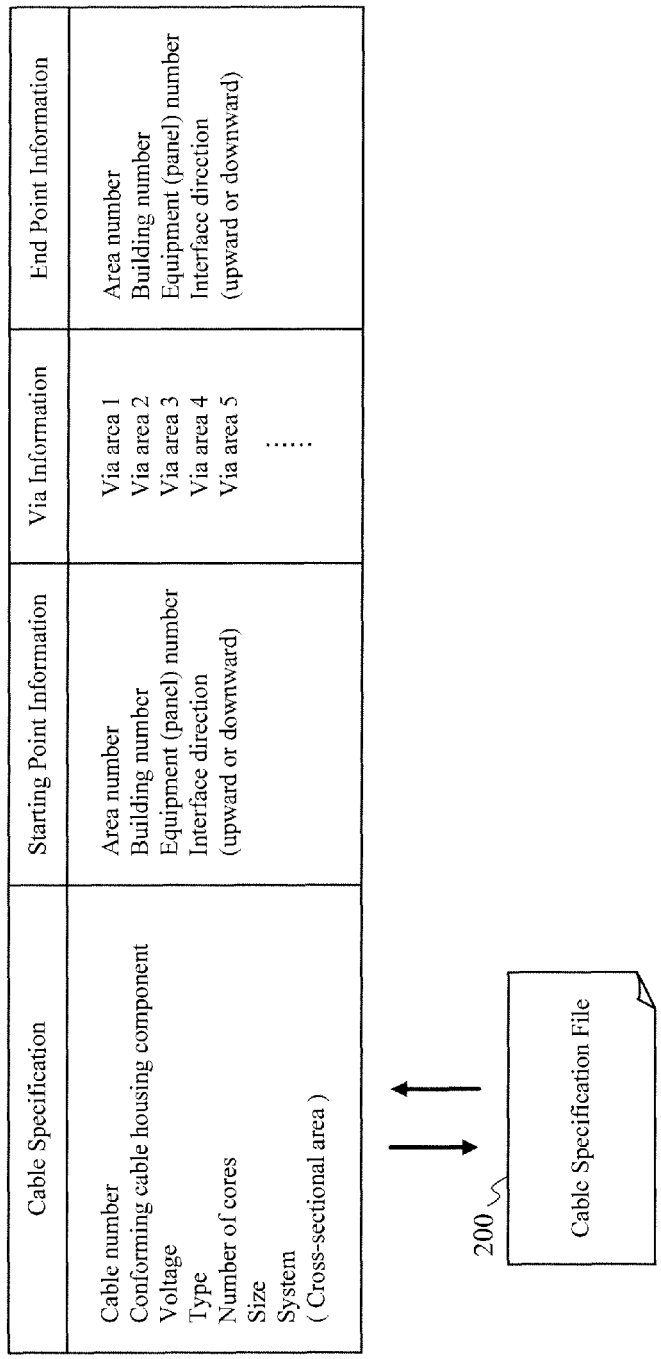
FIG. 2 shows the configuration of a cable list file of an embodiment of the invention.

As shown in FIG. 2, the cable list file 100 comprises cable specifications, starting point information (corresponding to "starting point data"), via information (corresponding to "via data"), and end point information (corresponding to "end point data").

Here, cable specifications is cable specification information such as cable numbers, conforming cable housing components, voltages, types, numbers of cores, sizes, systems, and similar; in particular, conforming cable housing components are cable housing components appropriate for each cable, and housing component destinations are stored by system. Starting point information is information relating to an area number indicating a prescribed region, the number of a building positioned within the area, the number of equipment (panel) positioned within the building, an interface direction to the equipment (panel), and other information relating to the cable starting point.

Via information described via areas on a cable route; for example, via area 1, via area 2, via area 3, via area 4, via area 5, and other areas are stored. End point information is information relating to the an area number indicating a prescribed region, the number of a building positioned within the area, the number of equipment (panel) positioned within the building, an interface direction to the equipment (panel), and other information relating to the cable end point.

The cable specification file 200 stores cross-sectional areas of cables according to cable specifications. As shown in FIG. 2, cable cross-sectional areas are acquired when the cable specification file 200 is connected in the cable list file 100, by searching on the cable specification file 200 based on the conforming cable housing components, voltage, type, number of cores, size, and other cable specifications. Cable cross-sectional areas can also be stored in advance in the cable list file 100.

As shown in FIG. 3, the area coordinate file 300 utilizes a list format to store, as area numbers, the minimum point coordinates (X1, Y1, Z1) and maximum point coordinates (X2, Y2, Z2) comprised by the area. As shown in FIG. 4, the area of a rectangular parallelepiped in a virtual three-dimensional space is formed from the minimum point coordinates and maximum point coordinates.

An area formed from coordinates stored in the area coordinate file 300 is a range enclosing objects of interest, and so what is of interest may be equipment, electric panels, control panels, buildings, facility ranges, duty ranges, system ranges, other logical ranges, or anything else (in the following, facility ranges are the largest ranges; within these are building ranges, and within buildings are equipment and panel ranges).

The above-described cable list file 100, cable specification file 200, and area coordinate file 300 are input source information, and may be in spreadsheet, text, or database form; it is assumed that all can be read from other applications.

{1.2 Control Unit}

Next, the control unit 400 has a section for executing various functions described below, and a graphic interface or batch processing section for reading data stored in the cable list file 100, cable specification file 200, and area coordinate file 300.

The control unit 400 has an area generation section 410, which first reads the area number, minimum point coordinates, and maximum point coordinates from the area coordinate file 300, to generate a prescribed area in virtual three-dimensional space. This area generation section 410 forms the area, and also designates a representative point in the center of each face of the area for connection of cable housing component routes, as shown in FIG. 4.

Further, the control unit 400 has a cable information acquisition section 420 (corresponding to the "cable data acquisition section"), for acquiring information relating to cables from the cable list file 100 and cable specification file 200. This cable information acquisition section 420 has a cable list information acquisition section 421, for acquiring cable specifications and other information stored in the cable list file 100, and a cross-sectional area information acquisition section 422, for acquiring, from the cable specification file 200, cross-sectional area information for the cable corresponding to cable specifications acquired from the cable list file 100.

Further, a processing order setting section 423 is provided which, when for example a processing priority order is stored in the cable list file 100 for each cable of the cable housing component arrangement design, sets the processing order taking this priority order into consideration.

Figure 5:
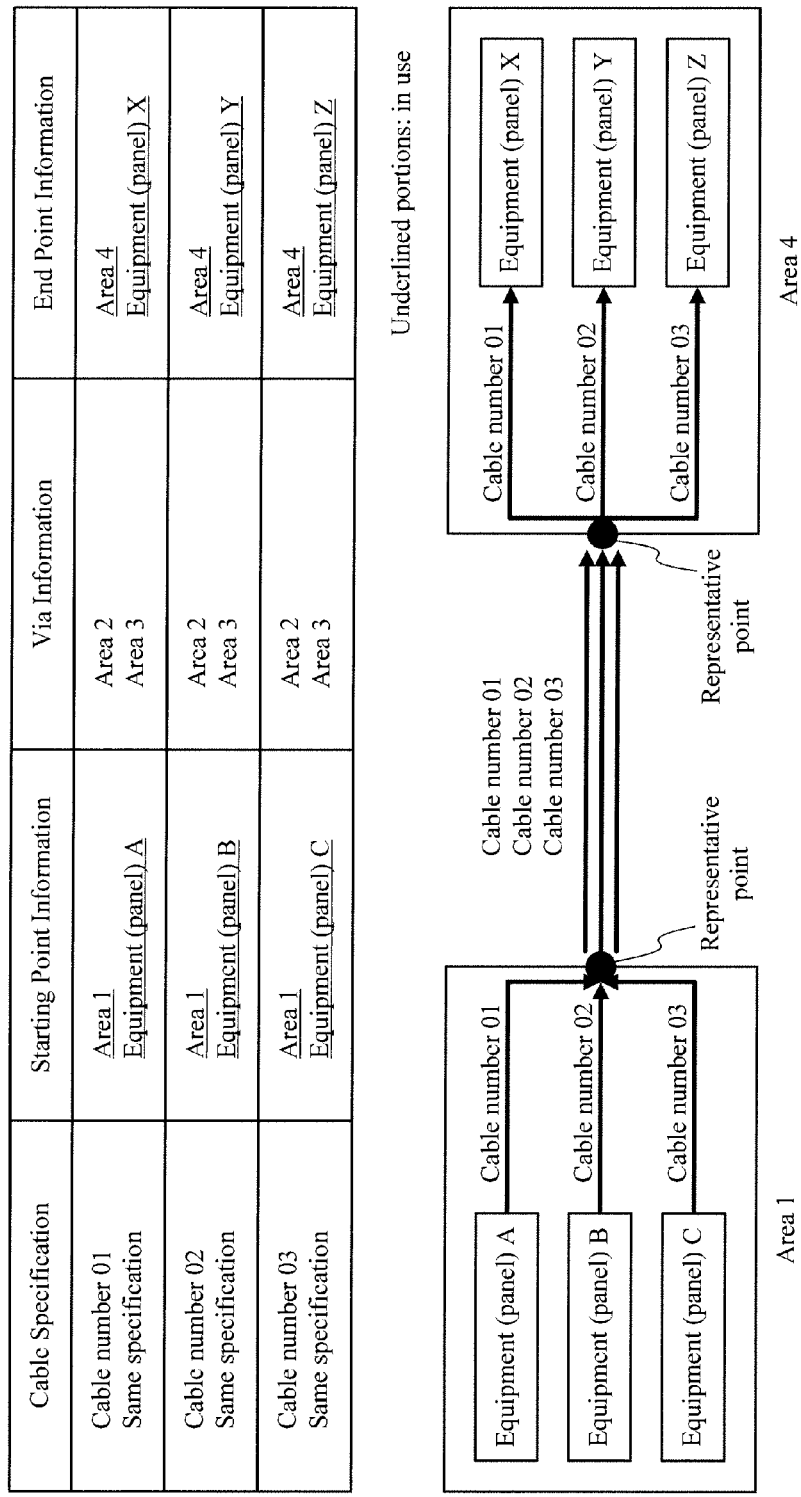
FIG. 5 shows a cable housing component route, generated by cable housing component route generation section of the control unit of an embodiment of the invention.

Also, the control unit 400 has a route generation section 430 for generating routes for cable housing components arranged between the starting point information and the end point information (the starting point equipment (panel) and end point equipment (panel)). As shown in FIG. 5, this route generation section 430 generates a cable housing component route which connects the equipment (panel) corresponding to the starting point information within the prescribed area and the equipment (panel) corresponding to the end point information within the prescribed area, based on information relating to the cable acquired by the cable information acquisition section 420.

For example, as in FIG. 5, the cable with number 01 is connected from the equipment (panel) A of area 1 which is the starting point to the equipment (panel) X of area 4 which is the end point. And, the cable with number 02 is connected from the equipment (panel) B of area 1 which is the starting point to the equipment (panel) Y of area 4 which is the end point. The cable with number 03 is connected from the equipment (panel) C of area 1 which is the starting point to the equipment (panel) Z of area 4 which is the end point.

Here, the route generation section 430 generates routes such that the shortest distances are covered between areas, so that the cables with numbers 01, 02 and 03 are connected from the same representative point of area 1, forming a prescribed rectangular parallelepiped, passing through the same representative point of area 4. That is, in the example of FIG. 5, the cables with the numbers 01 to 03 have the starting point area and the end point area in common, so that the locus of routes of cable housing components from area 1 to area 4 is the same.

Further, because cable for isolation or high-voltage motors may give rise to electromagnetic induction in some routes with other cables, the route generation section 430 generates cable housing component routes which avoid electromagnetic induction by, for example, performing "distancing" or "direct arrangement" or similar with respect to such cable, based on the cable types in cable specifications acquired from the cable list file 100 by the cable information acquisition section 420.

Figure 6:
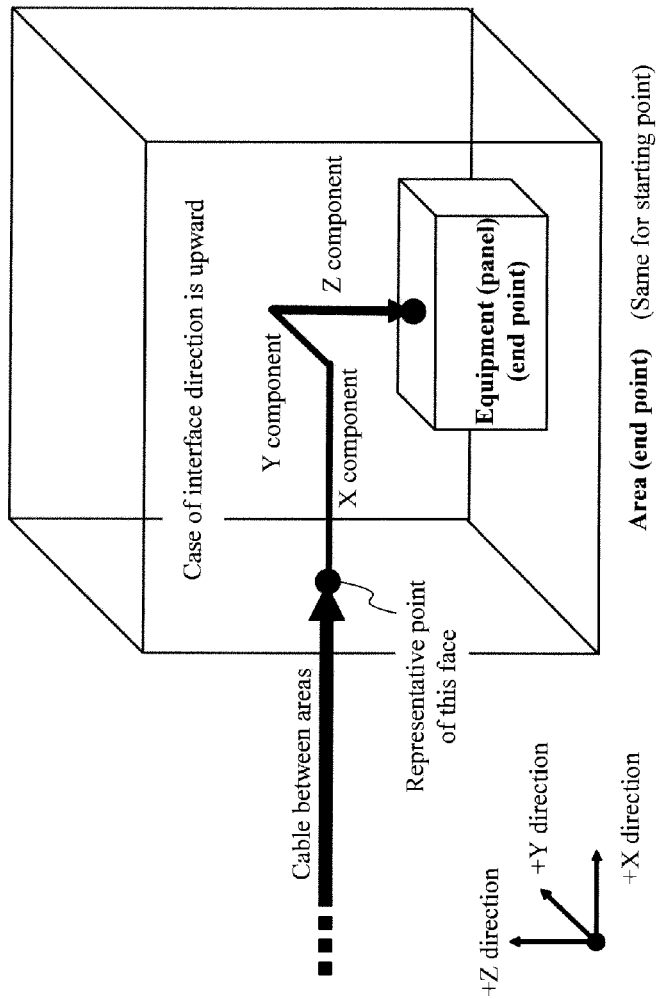
FIG. 6 shows interface settings for equipment in an area of an embodiment of the invention.

This cable accommodation route generation section 430 further has a function, when generating the cable housing component route, to set the interface direction to the equipment (panel) within the area, as shown in FIG. 6. Specifically, at the time of generation of a cable housing component route, this interface setting function connects a cable housing component from the upward direction to the equipment (panel) in the area if the interface direction is upward, or connects the cable housing component to the equipment (panel) from the downward direction if downward, based on the interface direction corresponding to the starting point and end point information acquired from the cable list file 100 by the cable information acquisition section 420.

Figure 7:
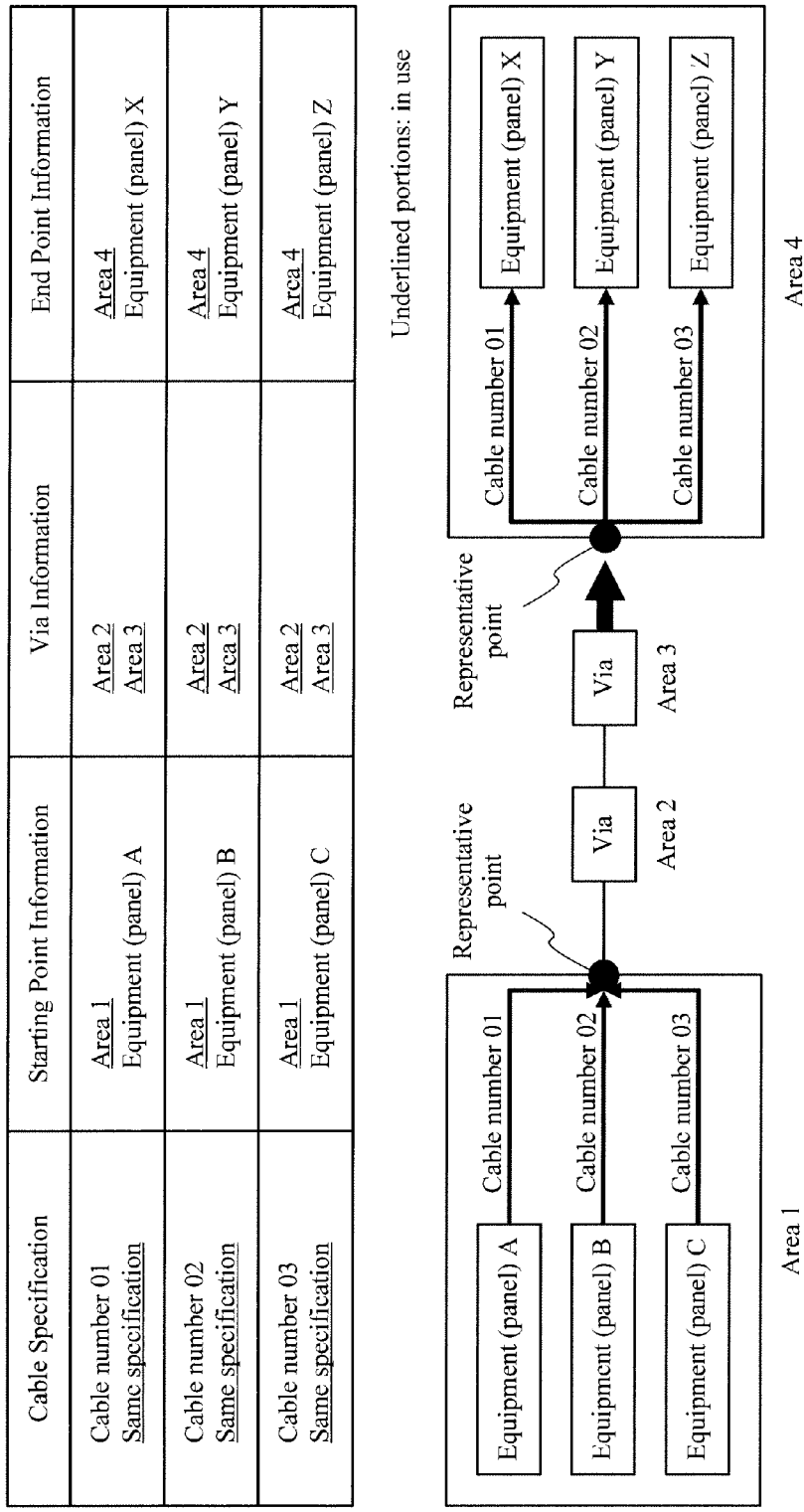
FIG. 7 shows consolidation of cable housing component routes by the route consolidation section of the control unit of an embodiment of the invention.

The control unit 400 has a route consolidation section 440, which, for the routes of each cable generated by the cable accommodation route generation section 430, consolidates routes with the same the cable specifications, starting point, via and end point areas into a single route. For example, as shown in FIG. 7, the cables with cable numbers 01 to 03 acquired from the cable list file 100 by the cable information acquisition section 420 have the same specifications, and the starting point area 1, via area 2, via area 3, and end point area 4 are also the same, so that the route consolidation section 440 consolidates the cable housing component routes generated by the route generation section 430 for each of these cables into the same single route.

These cables also have in common area 1 and area 4 representative points, which are route connection locations generated by the route generation section 430, so that more specifically, the route consolidation section 440 connects the same cable housing component route from the representative point of area 1 to the representative point of area 4, and within area 1 and area 4, each of the routes is separated and connected to the corresponding equipment (panels).

Further, the control unit 400 has a cross-sectional area calculation section 450 for calculating the total cross-sectional area of cables consolidated into the same route by the route consolidation section 440. That is, the cross-sectional area calculation section 450 calculates the sum of the cross-sectional areas of cables of interest, among the cross-sectional areas of the cables acquired by the cable information acquisition section 420 through the cable list file 100 and cable specification file 200, upon consolidation into the same route by the route consolidation section 400.

Further, the control unit 400 has a route correction section 460 for correcting a cable housing component route, consolidated into one by the route consolidation section 440, such that the shortest distances are covered between the starting point area and a via area, between via areas, and between a via area and the end point area, taking into consideration the conditions of selection of via area faces. Specifically, this route correction section 460 corrects a generated cable housing component route such that, as shown in FIG. 8, in the via areas 2 and 3 through which the route passes, the route passes linearly between faces of the via areas 2, 3 in which the cross-sectional areas are small.

Figure 8:
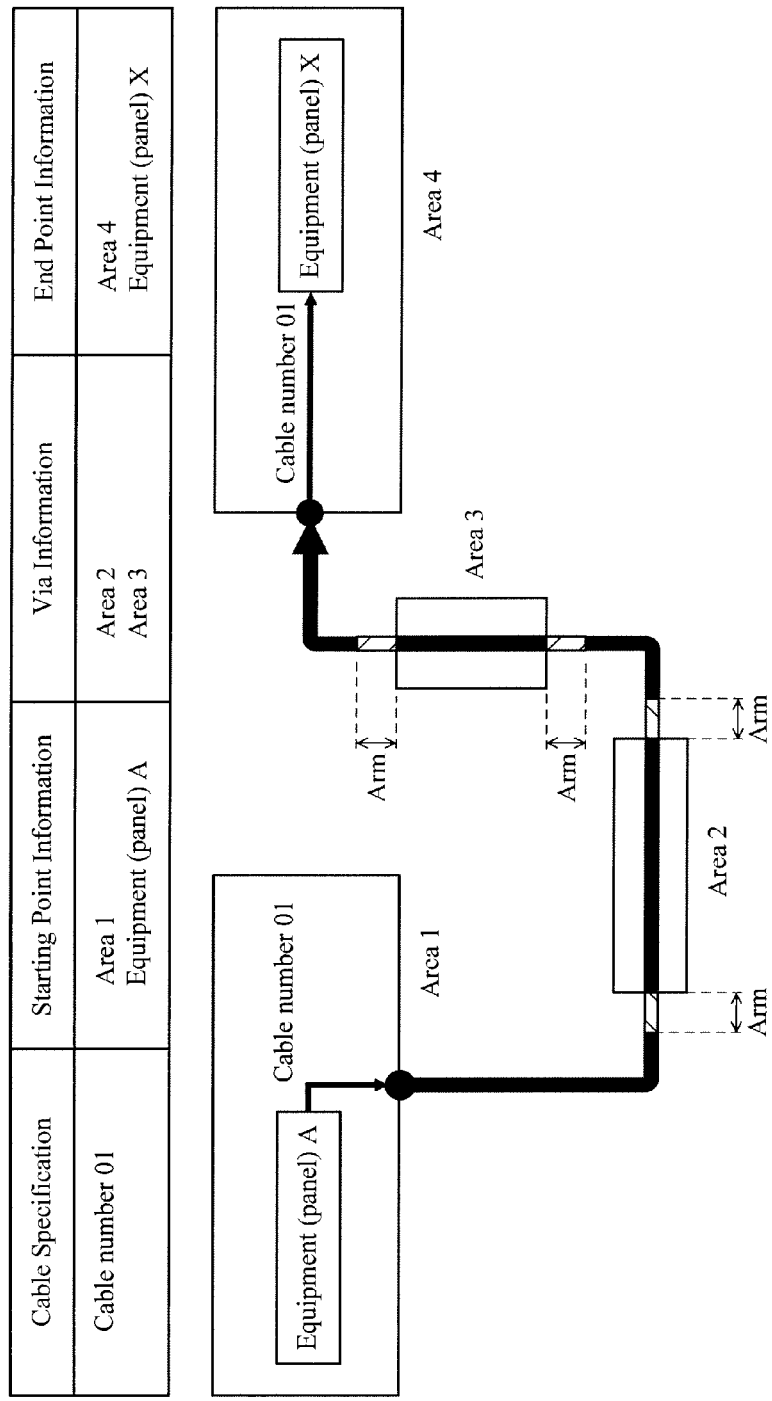
FIG. 8 shows route correction by the route correction section of the control unit of an embodiment of the invention.

In actuality, as shown in FIG. 8, the route correction section 460 provides arms having prescribed distances for cable housing component connection in faces of each of the via areas through which the route passes, and connects the arms to the cable housing components comprised by the above route. Shapes, including arm distances and similar, are for example set in advance in the cable list file 100.

Cable accommodation routes not having the same cable specifications or similar can be corrected in this manner, relative to the cable housing component routes generated by the route generation section 430. Further, when a cable housing component route generated by the route generation section 430 does not have a via area, area faces are selected such that the shortest distance is covered between the starting point area and the end point area, and the cable housing components are connected on these faces.

In this route correction section 460, in order to avoid electromagnetic induction on routes, cable housing component routes can be generated by performing "distancing" or "direct arrangement" or similar with respect to such cables, based on the cable types in cable specifications acquired from the cable list file 100 by the cable information acquisition section 420.

The control unit 400 has a xyz component conversion section 470 for converting a cable housing component route between two areas into a route using three xyz components. Also, when a cable housing component route consolidated by the route consolidation section 440 has a via area, so that a plurality of intervals between areas exist, this xyz component conversion section 470 combines each of the cable housing component routes between areas and converted into xyz components.

Figure 9:
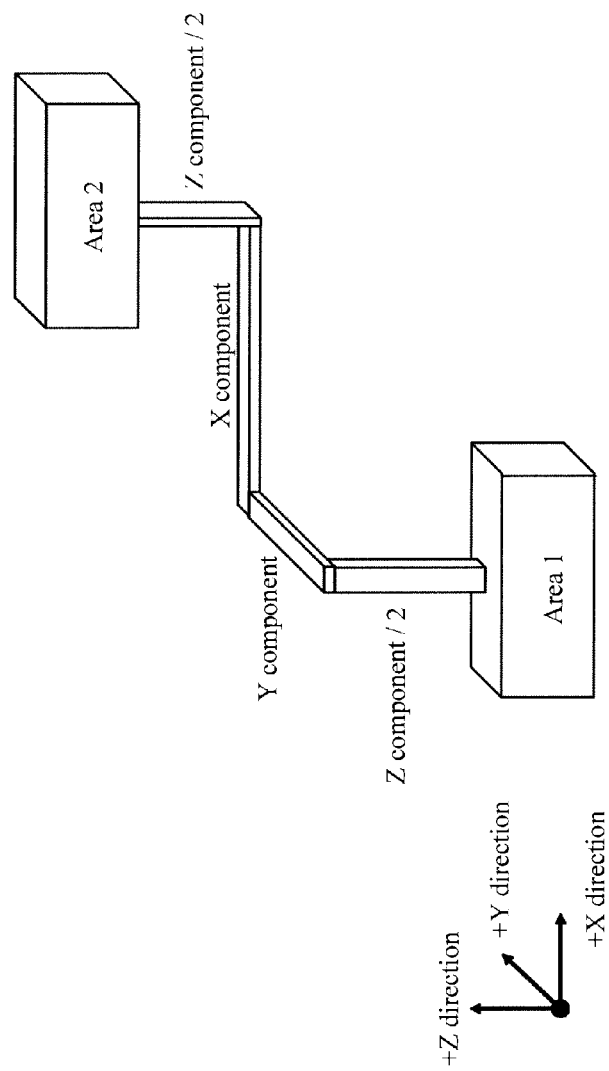
FIG. 9 is an xyz component conversion diagram of cable housing component routes by the xyz component conversion section of the control unit of an embodiment of the invention.

Specifically, the xyz component conversion section 470 automatically converts each of the intervals between areas of cable housing components corrected by the route correction section 460 into arrangements in xyz component directions, as shown in FIG. 9. That is, the shortest routes between areas are determined by the route correction section 460, and so the three xyz components are used to generate routes for cable housing components so as to connect the representative points on the faces of the areas according to the shortest routes.

Here, the xyz component conversion section 470 arranges the x-y components continuously, divides the z components, and converts the cable housing component route into xyz components so as to be arranged at both ends of the X-Y components. In plant design, x-y components correspond to cable housing component routes positioned in a certain floor plane, and the amount of material resources of cable housing components here is large as well, so that the need arises to arrange the x-y components continuously, whereas z components correspond to routes which pass through boundary between floors within the plant, and so are divided and arranged at both ends of the x-y components.

Further, the control unit 400 has three-dimensional model conversion section 480, for converting a cable housing component route between areas, converted by the xyz component conversion section 470, into a model for three-dimensional CAD data (also called a "three-dimensional cable housing component route model"). Specifically, this three-dimensional model conversion section 480 has the following functions.

Cable housing component cross-sectional area calculation section 481 is provided which divides the sum of the cable cross-sectional areas, calculated by the cross-sectional area calculation section 450, by the cable occupancy, to calculate the cross-sectional area of a cable housing component. The cable occupancy is the ratio of the cable cross-sectional area occupying the cross-section of the cable housing component, and for engineering purposes is a value set as a cable specification.

Figure 10:
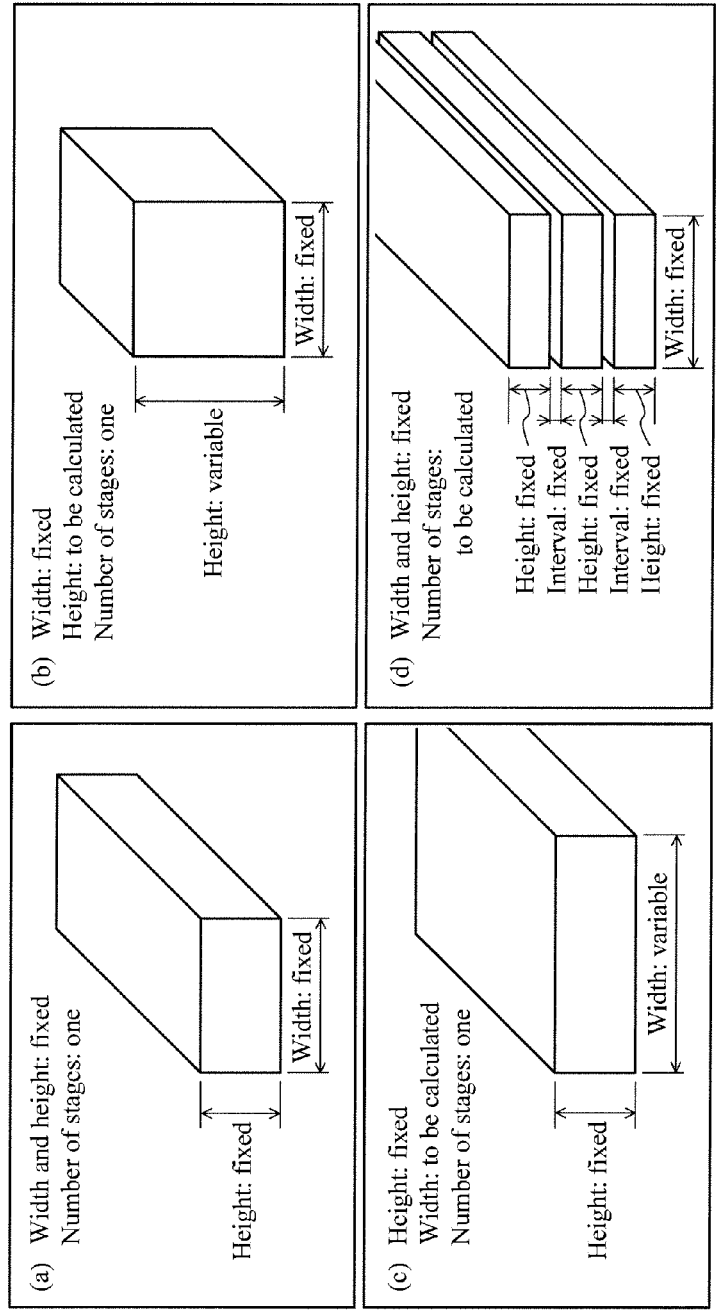
FIG. 10 shows addition of widths, heights, and stages to a cable housing component route cross-section by the three-dimensional conversion section of the control unit of an embodiment of the invention.
Figure 11:
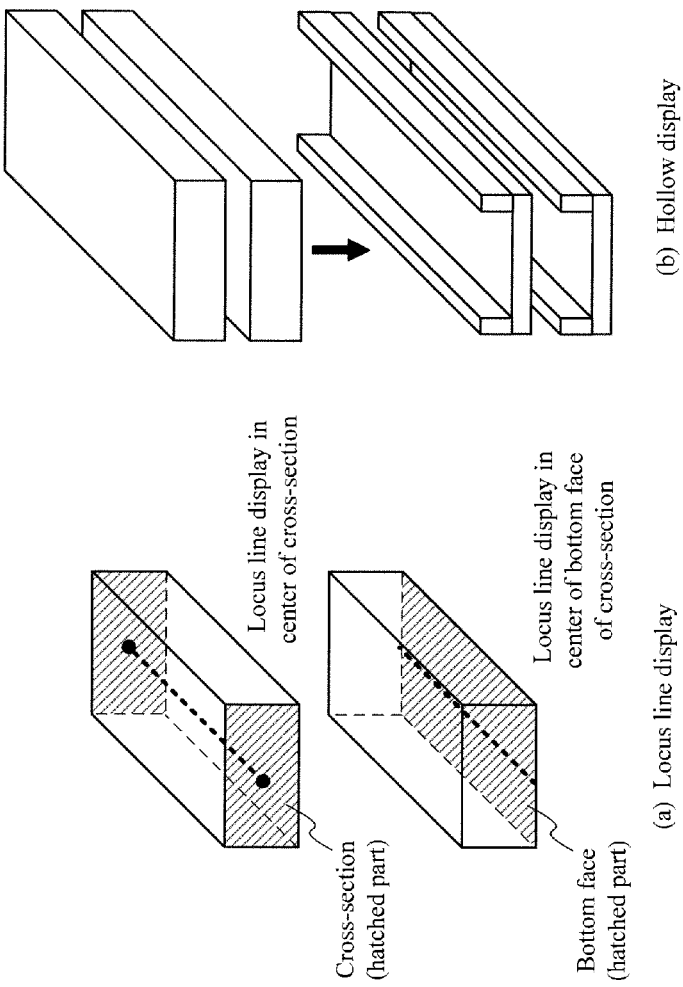
FIG. 11 shows cross-section locus line display by the locus line display section, and removal processing by the hollow display section, of the three-dimensional conversion section of the control unit of an embodiment of the invention.

As shown in FIG. 10, this three-dimensional model conversion section 480 has width/height/stage addition section 482, for adding the width, height, and stages to the route cross-section of a cable housing component, according to the cable housing component cross-sectional area calculated by the cable housing component cross-sectional area calculation section 481. This width/height/stage addition section 482 calculates the width and height, and when necessary the number of stages, to be added to the cross-section of a cable housing component route, based on the cross-sectional area of the cable housing component calculated by the cable housing component cross-sectional area calculation section 481, and adds these as the shape of the route cross-section.

Specifically, as shown in FIG. 10A, when both the width and height of a cross-section are set to fixed values during initial settings, the preset (fixed) height and (fixed) width are applied to the cross-section, and three-dimensional CAD data is generated. At this time, the width and height are both fixed values, and the number of stages is one stage, so that the width and height are added to the route cross-section, regardless of the cross-sectional area.

On the other hand, when calculating the height from the cross-sectional area with the width fixed, as shown in FIG. 10B the cross-sectional area of the cable housing component calculated by the cable housing component cross-sectional area calculation section 481 is divided by the preset (fixed) width to calculate the (variable) height, and this (fixed) width and (variable) height are added to the cross-section of the cable housing component route.

Further, when calculating the width from the cross-sectional area with the height fixed, as shown in FIG. 10C the cross-sectional area of the cable housing component calculated by the cable housing component cross-sectional area calculation section 481 is divided by the preset (fixed) height to calculate the (variable) width, and this (variable) width and (fixed) height are added to the cross-section of the cable housing component route.

Further, when calculating the number of stages from the cross-sectional area with the width and height fixed, as shown in FIG. 10D, the cross-sectional area of the cable housing component calculated by the cable housing component cross-sectional area calculation section 481 is divided by the preset (fixed) width and (fixed) height to calculate the number of stages, and cable housing components for each stage with the (fixed) height and (fixed) width are arranged at intervals for cable housing components set at the time of initial settings.

Further, when a cable housing component has a circular cross-section, as in the case of cable conduit, by calculating a diameter from the cross-sectional area of the cable housing component calculated by the cable housing component cross-sectional area calculation section 481, the diameter is added to the cross-section.

Further, the three-dimensional model conversion section 480 has a locus line display section 483 for displaying a locus line for the cross-sections of cable housing components of a converted three-dimensional cable housing component route model. As shown in FIG. 11A, when locus line display is set during the initial settings, this locus line display section 483 displays locus lines in the centers of cross-sections, or in the centers of bottom faces, of cable housing components. Whether the location of display is the cross-section center or the center of the bottom face must be set in advance at the time of initial settings.

Further, a hollow display section 484 is provided for hollowing a housing component out and displaying the hollowed-out component, such as the actual cable housing component shown in FIG. 11B. This hollow display section 484 hollows the component out when the cable housing component has a circular cross-section, so that a hollow cylinder results. In this case, the thickness of the cable housing component must be set in advance at the time of initial settings.

The three-dimensional model conversion section 480 further has a bending component insertion section 485, for inserting a designated bending component at a bending portion of a cable housing component route to which a width, height, and number of stages have been added by the width/height/stages addition section 482. More specifically, the bending component insertion section 485 automatically inserts elbow components, which are bending components with a bending radius set at the time of initial settings, in bending portions of a three-dimensional cable housing component route model which has been converted into three-dimensional CAD data.

Figure 12:
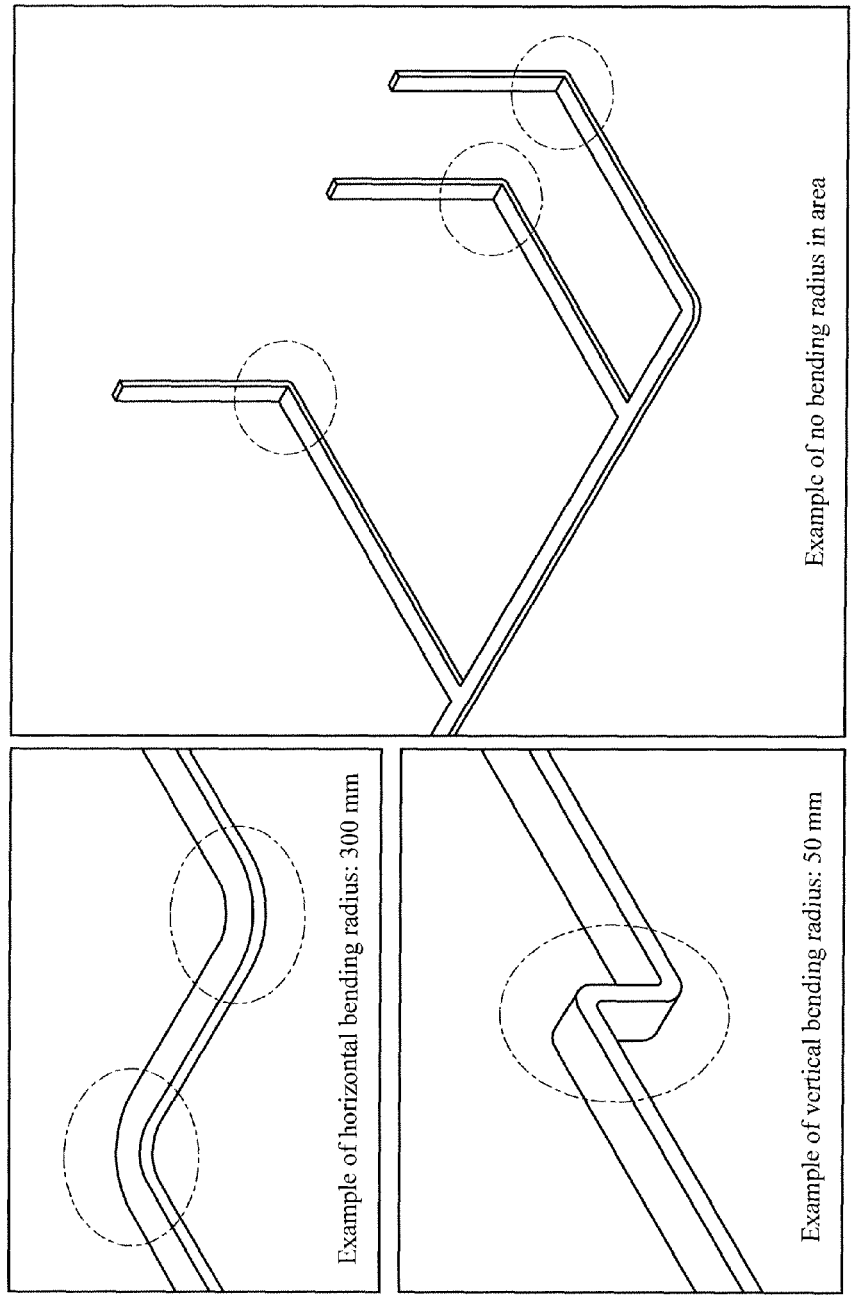
FIG. 12 shows insertion of bending components by the bending component insertion section of the three-dimensional conversion section of the control unit of an embodiment of the invention.

The bending radius of such bending components is input at the time of initial settings; but because it is necessary to insert components having bending radii which are different for bending vertically and horizontally, arbitrary shapes and bending radii can be set, as shown in FIG. 12. For example, when a cable housing component has a rectangular cross-section, a square-elbow component is inserted, and in the case of a circular cross-section, and circular-ring component is inserted. No bending radius setting can also be made, in this case, a bending radius is not given.

Further, the control unit 400 has an output section 490, for outputting a generated three-dimensional cable housing component route model, and the cable length of the model. This output section 490 has a route output section 491, for outputting a three-dimensional cable housing component route model to the outside; a cable length calculation section 492, for calculating the cable length of the entire cable housing component route; and a cable length addition section 493, for adding calculated cable length information to the cable list file 100. A cable list file 100 with the cable length of a three-dimensional cable housing component route model added by the cable length addition section 493 appears in FIG. 13.

{2. Action}

Next, the action of this embodiment having the configuration described above is explained below, referring to FIG. 14 to FIG. 20, taking as an example the cable housing components of cable which connects equipment of an electric power plant. When executing generation of three-dimensional arrangement adjustment CAD data for cable housing components using the control unit 400, the user must make the initial settings indicated below.

That is, as shown in FIG. 15, as initial settings the input files to be applied, the output files, and the processing conditions are set. Specifically, the user designates the cable list file, area coordinate file, and cable specification file as the input files, as indicated in the settings screen of FIG. 15. And as the output file, a three-dimensional cable housing component model file, cable list file (reflecting processing results), and processing process log file indicating processing processes in the control unit 400, are designated.

Further, as processing conditions, the processing filters for selecting cable specifications for processing, cross-section settings to specify cable cross-sectional shapes and similar, route-related settings such as the bending radii of bending components inserted into bending portions of cable housing components, and other settings are designated. As these processing filters, conforming cable housing components, voltages, cable types, and other cable specifications may be used; specifications which are not of interest for processing are designated arbitrarily.

Cross-sectional settings set cross-sections for cable housing components when converted into three-dimensional CAD data; cable occupancies, whether cross-section widths and heights are fixed or variable, intervals between cable housing components, and locus line display, hollow display, and other methods of cross-section representation are designated. When setting a route, settings relating to routes for cable housing components converted into three-dimensional CAD data are made, and for example the horizontal bending radius and vertical bending radius for bending components inserted into bending portions of a route, arm lengths from area faces, and interface lengths to equipment (panels), are designated.

Figure 14:
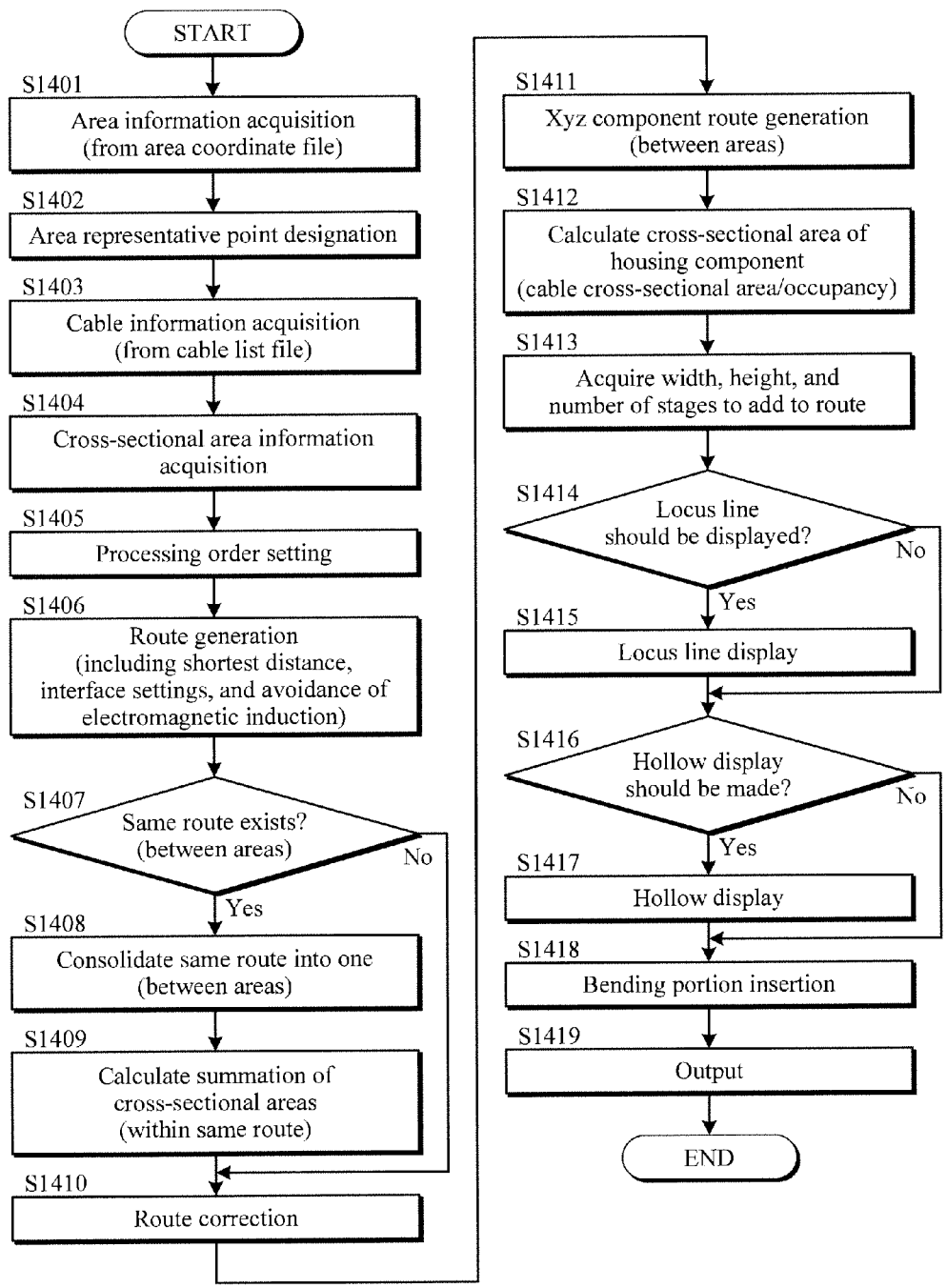
FIG. 14 is a flowchart showing the procedure for generation of a three-dimensional cable housing component route model of the control unit of an embodiment of the invention.

After making the above-described initial settings, an output file is generated in the control unit 400 as described below. First, as shown in FIG. 14, the area generation section 410 reads prescribed area numbers, minimum point coordinates and maximum point coordinates from the area coordinate file 300, and generates a prescribed area in virtual three-dimensional space (S1401). Further, the area generation section 410 designates representative points for connection of cable housing components in the center of each face of the generated area (at six locations, front-back, right-left, and up-down) (S1402).

Next, in the cable information acquisition section 420, the cable list information acquisition section 421 acquires cable specifications, starting point information, end point information, and other information stored in cable lists, from the cable list file 100 (S1403). And, the cross-sectional area information acquisition section 422 acquires, from the cable specification file 200, the cross-sectional area information for cables corresponding to the cables acquired from the cable list file 100 (S1404). Further, the processing order setting section 423 sets the processing order based on the priority order for processing for each cable, stored in the cable list file 100 (S1405).

And, when this processing by the cable information acquisition section 420 is performed, the route generation section 430 generates a cable housing component route for arrangement of cable housing components, connecting the equipment (panel) corresponding to the starting point information in the prescribed area to the equipment (panel) corresponding to the end point information in the prescribed area, based on information relating to cables acquired by the cable information acquisition section 420 (S1406). Here, the route generation section 430 generates a route, based on interface directions corresponding to the starting point and end point information read from the cable list file 100 by the cable information acquisition section 420, so as to connect the cable housing component from the upward direction to the equipment (panel) in the area if the interface direction is the upward direction, or to connect the cable housing component to the equipment (panel) from the downward direction if the interface direction is the downward direction.

When a cable housing component route is generated for each cable by the route generation section 430, the route consolidation section 440 judges whether there are routes having the same cable specifications and starting point, via and end point areas (S1407) and when these are judge to be the same route (YES in S1407), these routes are consolidated into one as the same route (S1408). In generating the same route by the route consolidation section 440, via areas read by the cable information acquisition section 420 are also taken into consideration.

And, when consolidation into the same route is performed by the route consolidation section 440, the cross-sectional area calculation section 450 calculates the total cross-sectional area of cables comprised by the consolidated route (S1409). That is, the cross-sectional area calculation section 450 calculates the sum of the cross-sectional areas of cables of interest upon consolidation into the same route by the route consolidation section 400, among the cross-sectional areas of cables acquired by the cable information acquisition section 420 through the cable list file 100 and cable specification file 200.

In S1407, when it is judged that there are no routes having the same cable specifications and starting point, via and end point areas (NO in S1407), the processing of S1408 and S1409 is not performed.

And, the route correction section 460 corrects the cable housing component route consolidated into one by the route consolidation section 440 such that the shortest distances are covered between the starting point area and a via area, between via areas, and between a via area and the end point area, taking into consideration the conditions for selection of via area faces (S1410). Specifically, this route correction section 460 corrects the generated cable housing component route such that in via areas, faces with small cross-sectional areas of the via area are passed through in straight lines, such that the shortest distances are covered between the starting point area and a via area, between via areas, and between a via area and the end point area. When the generated cable housing component route does not have via areas, the area faces of the starting point area and the end point area resulting in the shortest distance between the areas are selected, and cable housing components are connected on these faces.

And, the xyz component conversion section 470 automatically converts each interval between areas of cable housing components corrected by the route correction section 460 into arrangement of xyz components, and when a plurality of intervals between areas exist, combines the cable housing component routes converted into xyz components of intervals between areas (S1411). Route correction has already been performed by the route correction section 460 taking the shortest distances between areas into consideration, so that the xyz component conversion section 470 combines cable housing component routes between areas converted into xyz components so as to connect representative points on the faces of each area.

Next, the three-dimensional model conversion section 480 converts the cable housing component route between areas, converted by the xyz component conversion section 470, into a three-dimensional CAD data model (S1412 to S1418). Specifically, first the cable housing component cross-sectional area calculation section 481 divides the sum of the cross-sectional areas of cables consolidated into one route, calculated by the cross-sectional area calculation section 450, by the cable occupancy, to calculate the cross-sectional area of the cable housing component (S1412).

And, the width/height/stage addition section 482 adds a width and height, and if necessary a stage, to the route cross-section of cable housing components, according to the cable housing component cross-sectional area calculated by the cable housing component cross-sectional area calculation section 481 (S1413). That is, based on the cross-sectional area of a cable housing component calculated by the cable housing component cross-sectional area calculation section 481, the width/height/stage addition section 482 calculates the width, height, and if necessary the number of stages to be added to the cable housing component route cross-section, and adds these to the route cross-section.

Next, the locus line display section 483 judges whether locus line display is set as a method of cross-section representation in the cross-section settings at the time of initial settings (S1414), and if locus line display is set, displays locus lines at the center of the cross-section, or in the center of the bottom faces, of the cable housing component route to which the width, height, and number of stages have been added (S1415).

And, the hollow display section 484 judges whether removal processing has been set as a cross-section representation method in the cross-section settings at the time of initial settings (S1416), and when removal processing has been set, displays a state in which the interior of the cable housing component route, with width, height, and number of stages added, has been removed (S1417). Further, in the three-dimensional model conversion section 480, the bending component insertion section 485 inserts designated bending components into bending portions of the cable housing component route into which the width, height, and number of stages have been added by the width/height/stage addition section 482 (S1418).

Through the above-described S1401 to S1418, a three-dimensional cable housing component route model, which is a three-dimensional CAD data cable housing component route, is generated, and is output as a rile by the output section 490 (S1419).

Although not shown in FIG. 14, the cable length calculation section 492 calculates the cable length of the three-dimensional cable housing component route model thus generated, and the cable length addition section 493 adds the cable length thus calculated to the cable list file 100.

Here, an example of display of the three-dimensional cable housing component route model generated as described above is explained in order below, referring to FIG. 16 to FIG. 20. As in the actual cable list file 100 shown in FIG. 16, it is assumed that there are five cables having common cable specifications, starting point area, via areas 1 and 2, and end point area, that the starting point area and the equipment (panel) of the starting point in this area are common, and that end point equipment (panels) are installed as equipment 1 to 5 within the end point area. The interface direction of the starting point and end point are "downward".

Figure 17:
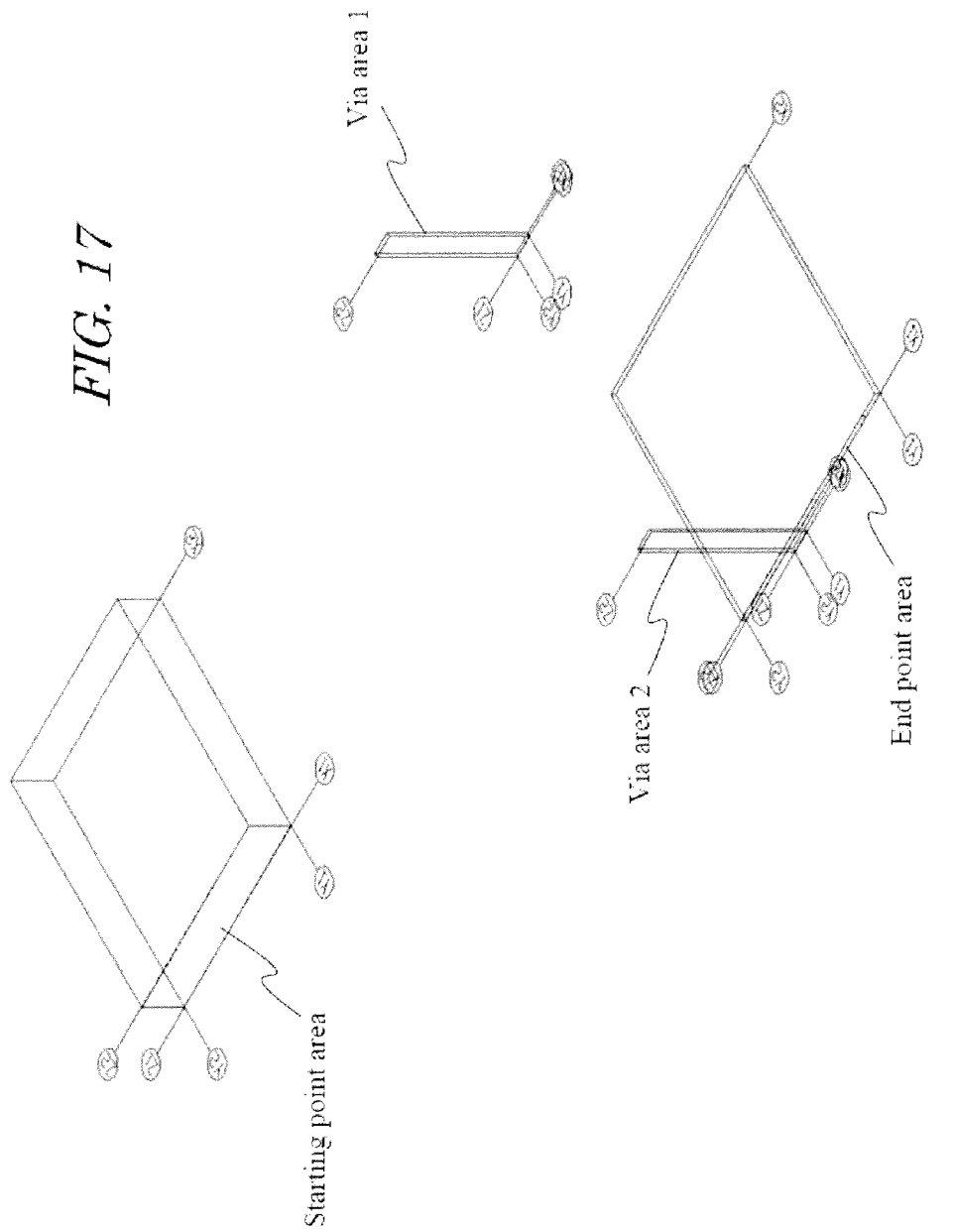
FIG. 17 is a three-dimensional CAD diagram, showing a starting point area, via areas, and an end point area, in an embodiment of the invention.
Figure 18:
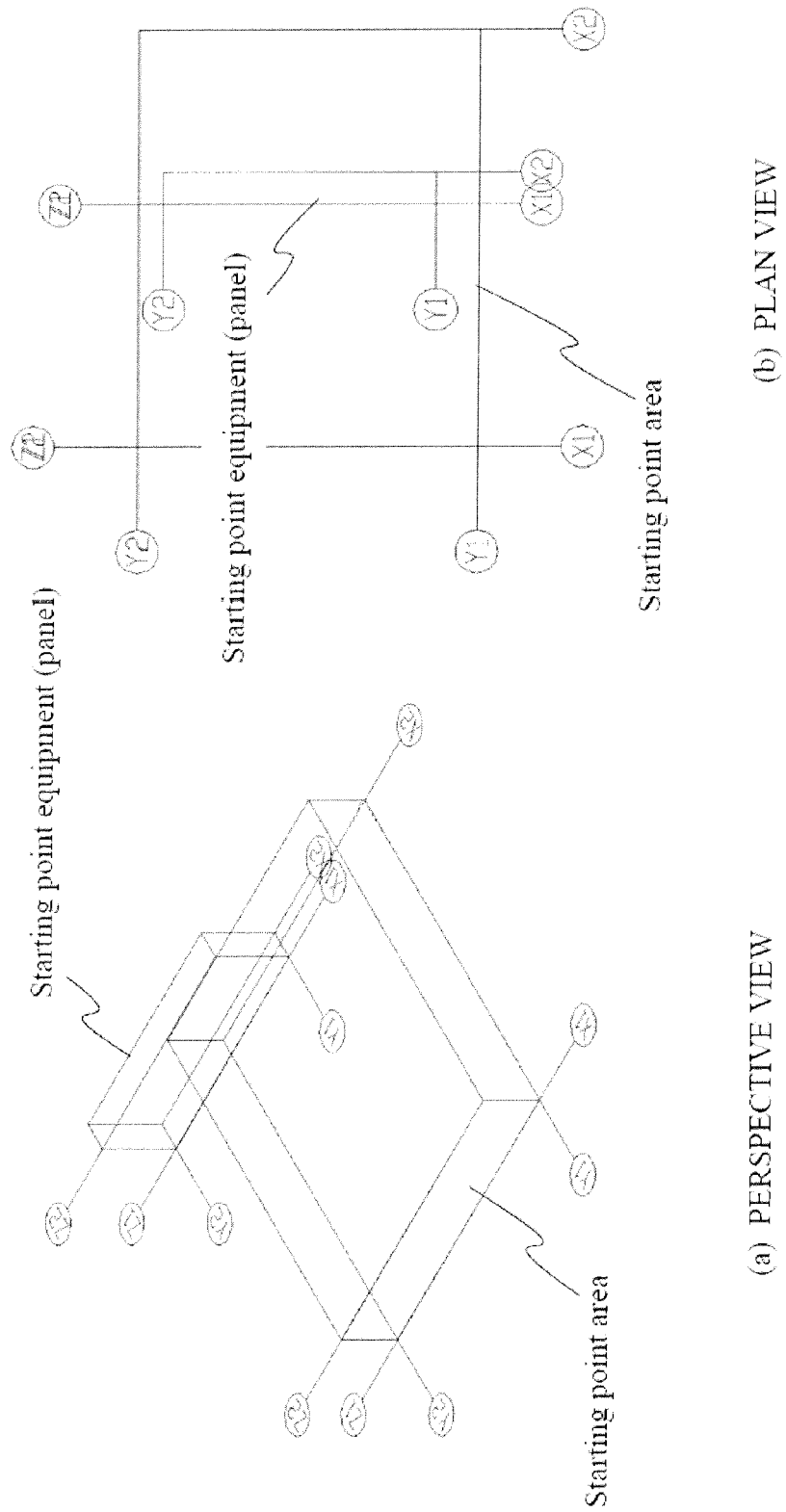
FIG. 18 is a three-dimensional CAD diagram, showing a starting point area and starting point equipment in an embodiment of the invention.
Figure 19:
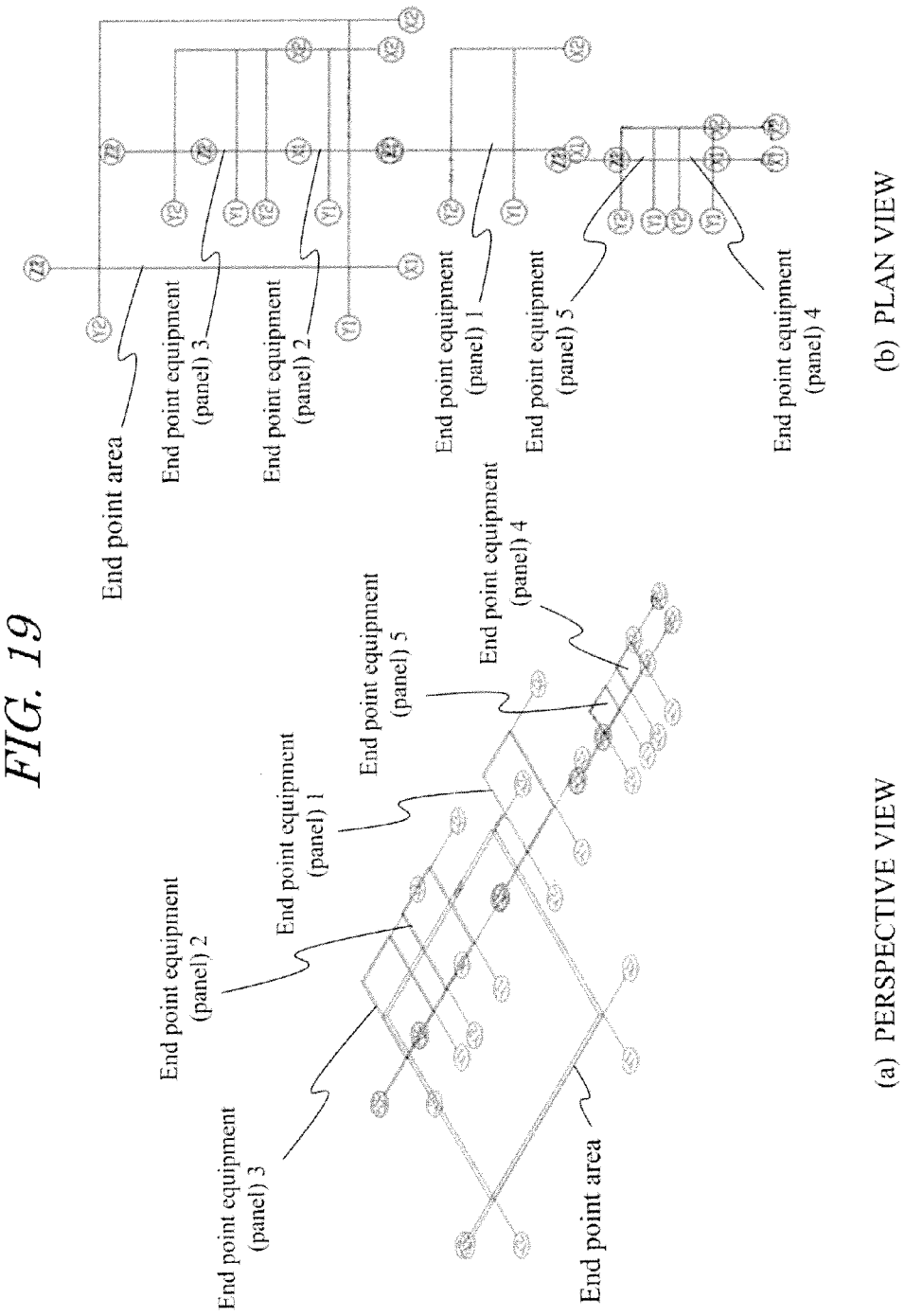
FIG. 19 is a three-dimensional CAD diagram, showing an end point area and end point equipment in an embodiment of the invention; and, FIG. 20 is a three-dimensional CAD diagram, showing a three-dimensional cable accommodation route model in an embodiment of the invention.

First, in the three-dimensional CAD space, in a state in which no cable housing component route has been generated, there exist a via area 1 and a via area 2 between a starting point area and an end point area, as shown in FIG. 17. This starting point area and the starting point equipment (panel) are as shown in FIG. 18, which shows a perspective view and plan view. Here, the position of the equipment in the areas is shown as already set. And in FIG. 19, the end point areas and end point equipment (panels) are shown in a perspective view and a plan view; the positions of the end point equipment (panels) 1 to 5 are shown as set in advance in the end point area.

Figure 20:
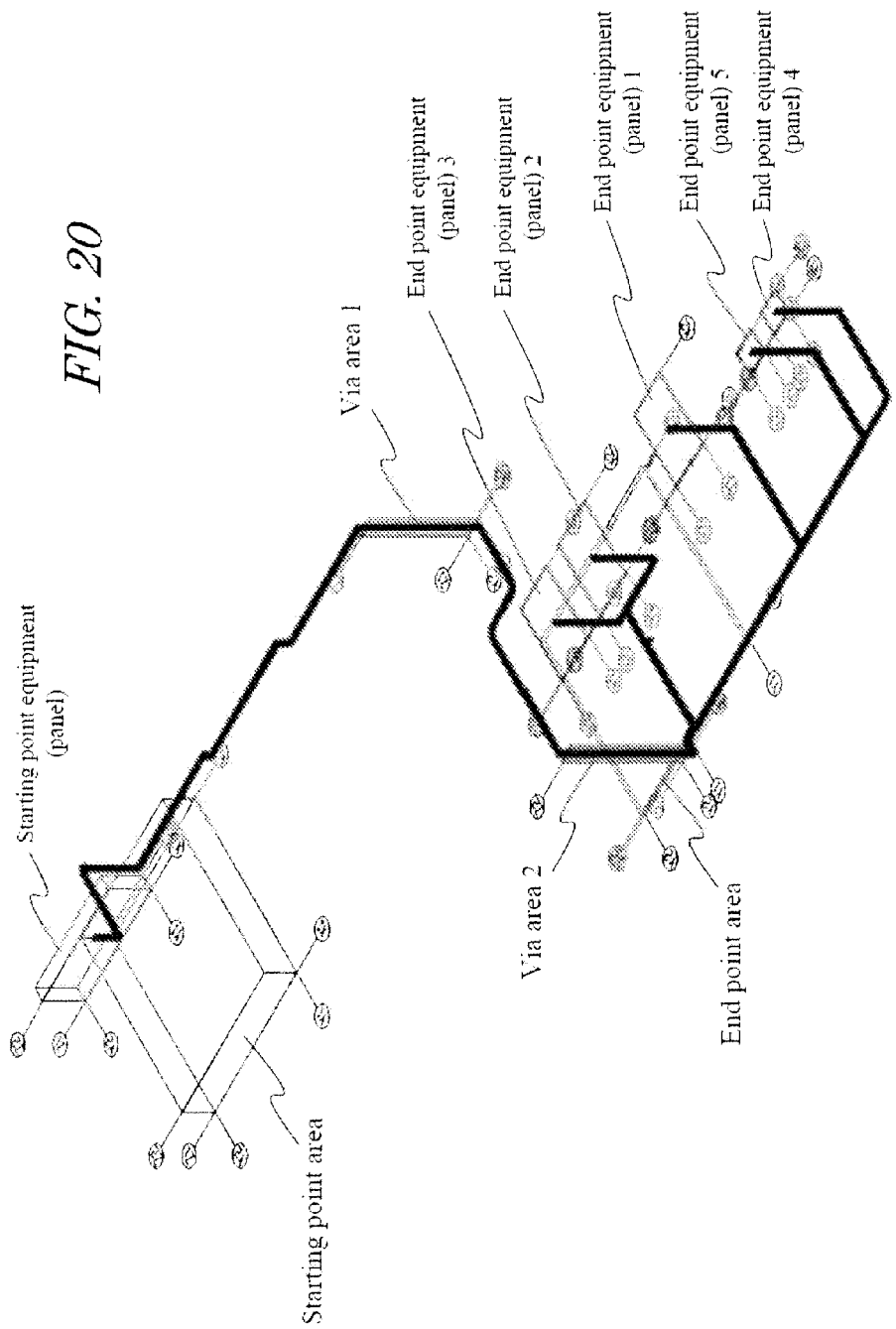

And, the three-dimensional cable housing component model generated by the control unit 400 is as shown in FIG. 20, shown as three-dimensional CAD data. The cross-sections of cable housing components are shown for conditions in which the widths are fixed, the heights are variable, and the number of stages is one. Here, by consolidating five cables having in common cable specifications, the starting point area, via areas, and end point area, as shown in FIG. 16, the cables are shown handled as the same cable housing component route. The starting point equipment (panel) is also common, so that the starting point area from the starting point equipment (panel) is consolidated as a single cable.

Further, in the cable list file 100 shown in FIG. 16, interface at the starting point equipment (panel) is "downward", so that cable housing components are interfaced downward for the starting point equipment (panel). And, the same consolidated cable housing component route passes in a straight line between the faces of the via area 1 and via area 2 having the smallest cross-sectional area. The cable housing component route reaching the representative point of the end point area arrives at end point equipment (panels) 1 to 5, and so is separated and directed toward each of the end points.

{3. Advantageous Effects}

By means of the above-described embodiment, a three-dimensional arrangement adjustment CAD data generation device, as well as a control method and control program for such a device can be provided, in which cable specifications and other cable data from a cable list file can be utilized, and moreover cable housing component routes having the same cable specifications, starting point data, and similar can be consolidated into the same route, so that even at the beginning of plant design, three-dimensional arrangement adjustment CAD data for the cable housing component routes can be generated easily and rapidly. By generating cable housing component routes in the initial stage of plant design, appropriate totaling of amount of material resources, procurement, and manufacture of cable housing components are possible, and moreover totaling of amount of material resources and procurement of the cable housed within the cable housing components are also possible. Hence the burden of design duties for cable housing components can be alleviated, and high-quality design and manufacture of such components can be realized.

This application claims priority from Japanese Patent Application 2009-58862, filed Mar. 12, 2009, which is incorporated herein by reference in its entirety.

The invention claimed is:

1. A generation device of three-dimensional arrangement adjustment CAD data for cable housing components, which designs using a three-dimensional CAD to arrange cable housing components for housing cables provided within a plant, the generation device comprising:
a memory configured to store:
an area coordinate file in which the minimum and maximum coordinates configuring a prescribed rectangular parallelepiped area; and
a cable list file in which cable data including specifications of the cables, starting point data, via data, and end point data;
a computer comprising:
an area generation section which reads the minimum and maximum coordinates from the area coordinate file stored in the memory and generates the prescribed rectangular parallelepiped area;
a cable data acquisition section which acquires the cable data from the cable list file stored in the memory;
a route generation section which generates, for each cable, a cable housing component route for arrangement of cable housing components which connects the area corresponding to the starting point data with the area corresponding to the end point data via areas corresponding to the via data, based on the prescribed rectangular parallelepiped area generated by the area generation section and the cable data acquired by the cable data acquisition section; a route consolidation section which consolidates into a single route any route having in common the cable specifications, the starting point data, the via data, and the end point data from among the cable housing component routes generated by the route generation section; and
a three-dimensional model conversion section which converts into a three-dimensional model by imparting a prescribed cross-section to the cable housing component route consolidated by the route consolidation section.

2. The generation device of three-dimensional arrangement adjustment CAD data for cable housing components according to claim 1, wherein:
the area generation section defines a representative point, in the center of each face of the area to be generated, for connection of a cable housing component route.

3. The generation device of three-dimensional arrangement adjustment CAD data for cable housing components according to claim 2, wherein:
the cable data includes an interface direction indicating a direction in which a cable housing component route is connected to the representative point of the area; and
the route generation section generates a cable housing component route based on the interface directions to the representative points of the area corresponding to the starting point data and of the area corresponding to the end point data.

4. The generation device of three-dimensional arrangement adjustment CAD data for cable housing components according to claim 1, further comprising:
a route correction section which corrects a cable housing component route such that the route passes through in the area corresponding to the via data, between faces of the via area in which the cross-sectional areas are small.

5. The generation device of three-dimensional arrangement adjustment CAD data for cable housing components according to claim 1, wherein:
the cable data acquisition section, when acquiring cable data from the cable list file, makes a filter processing to any cable that has a cable specification which is not of interest for processing.

6. The generation device of three-dimensional arrangement adjustment CAD data for cable housing components according to claim 1, wherein:

the cable data includes a processing priority order of the cable housing component arrangement design for each cable; and the cable data acquisition section changes processing order for each cable according to the processing priority order.

7. The generation device of three-dimensional arrangement adjustment CAD data for cable housing components according to claim 1, wherein:
the three-dimensional model conversion section has a section which adds, as the cross-section of a cable housing component route, a prescribed width and height.

8. The generation device of three-dimensional arrangement adjustment CAD data for cable housing components according to claim 7, the memory further configured to store:
a cable specification file in which the cross-sectional area of a cable corresponding to a cable specification, and wherein:
at the time of initial settings, at least one of the width and height of the cross-section of a cable housing component is input as a fixed value by a user;
the cable data acquisition section acquires the cross-sectional area of a cable from the cable specification file stored in the memory according to the specification of the cable in the cable list file stored in the memory; and
the three-dimensional model conversion section calculates the cross-sectional area of a cable housing component based on the cross-sectional area of the cable acquired by the cable data acquisition section and divides the cross-sectional area of the cable housing component by at least one of the width and height of the cross-section which is the fixed value to calculate the width or height of the cross-section of the cable housing component.

9. The generation device of three-dimensional arrangement adjustment CAD data for cable housing components according to claim 1, wherein:
the three-dimensional model conversion section has a bending component insertion section which inserts a prescribed bending component at a bending portion of a cable housing component route.

10. The generation device of three-dimensional arrangement adjustment CAD data for cable housing components according to claim 1, wherein:
the three-dimensional model conversion section has a locus line display section which displays a locus line in a cable housing component route.

11. The generation device of three-dimensional arrangement adjustment CAD data for cable housing components according to claim 1, wherein:
the three-dimensional model conversion section has a hollowed-out component display section which displays a cable housing component in a hollowed-out state.

12. The generation device of three-dimensional arrangement adjustment CAD data for cable housing components according to claim 1, further comprising:
a cable length calculation section which calculates the cable length of a three-dimensional model of a cable housing component route converted by the three-dimensional model conversion section; and a cable length addition section which adds a calculated cable length to the cable list file.

13. A computer-implemented control method of a generation device of three-dimensional arrangement adjustment CAD data for cable housing components, which designs using a three-dimensional CAD to arrange cable housing components for housing cables provided within a plant, the control method using:

an area coordinate file in which the minimum and maximum coordinates configuring a prescribed rectangular parallelepiped area are stored; and
a cable list file in which cable data including specifications of the cables, starting point data, via data, and end point data is stored, and comprising the steps of:
reading the minimum and maximum coordinates from the area coordinate file and generating the prescribed rectangular parallelepiped area;
acquiring the cable data from the cable list file and generating, for each cable, a cable housing component route for arrangement of cable housing components which connects the area corresponding to the starting point data with the area corresponding to the end point data via areas corresponding to the via data, based on the prescribed rectangular parallelepiped area and the cable data;
consolidating into a single route any route having in common the cable specifications, the starting point data, the via data, and the end point data from among the cable housing component routes; and
converting into a three-dimensional model by imparting a prescribed cross-section to the consolidated cable housing component route to generate a three-dimensional arrangement adjustment CAD data for cable housing components.

14. A non-transitory computer-accessible storage medium storing a control program of a generation device of three-dimensional arrangement adjustment CAD data for cable housing components, which designs by a computer using a three-dimensional CAD to arrange cable housing components for housing cables provided within a plant, the control program using:
an area coordinate file in which the minimum and maximum coordinates configuring a prescribed rectangular parallelepiped area are stored; and
a cable list file in which cable data including specifications of the cables, starting point data, via data, and end point data is stored, and causing the computer to carry out:
an area generation processing which reads the minimum and maximum coordinates from the area coordinate file and generates the prescribed rectangular parallelepiped area;
a cable data acquisition processing which acquires the cable data from the cable list file;
a route generation processing which generates, for each cable, a cable housing component route for arrangement of cable housing components which connects the area corresponding to the starting point data with the area corresponding to the end point data via areas corresponding to the via data, based on the prescribed rectangular parallelepiped area generated by the area generation processing and the cable data acquired by the cable data acquisition processing;
a route consolidation processing which consolidates into a single route any route having in common the cable specifications, the starting point data, the via data, and the end point data from among the cable housing component routes generated by the route generation processing; and
a three-dimensional model conversion processing which converts into a three-dimensional model by imparting a prescribed cross-section to the cable housing component route consolidated by the route consolidation processing.

* * * * *